United States Patent [19]

Baumann et al.

[11] 4,346,508
[45] Aug. 31, 1982

[54] REBORING FIXTURE AND METHOD

[75] Inventors: David L. Baumann, Bartonville; Richard A. Meismer, Metamora, both of Ill.

[73] Assignee: Caterpillar Tractor Co., Peoria, Ill.

[21] Appl. No.: 154,648

[22] Filed: May 30, 1980

[51] Int. Cl.³ .............................................. B23D 19/10
[52] U.S. Cl. ................................... 29/402.18; 408/79; 408/94; 408/115 R
[58] Field of Search .................. 408/1, 80, 79, 81, 94, 408/115 R, 708, 72 R, 93, 99, 241 R; 29/402.18

[56] References Cited

U.S. PATENT DOCUMENTS

| 1,384,043 | 7/1921 | Brubaker | 408/72 R |
| 2,120,525 | 6/1938 | McKerihan | 29/402.18 |
| 3,677,655 | 7/1972 | Ratteree et al. | 408/72 R |
| 3,767,316 | 10/1973 | Dumont, Jr. | 408/115 |

FOREIGN PATENT DOCUMENTS 58550 4/1913 Austria .................................. 408/81

Primary Examiner—Leonidas Vlachos
Attorney, Agent, or Firm—Phillips, Moore, Weissenberger, Lempio & Majestic

[57] ABSTRACT

Pin bores of excavator forebooms are subjected to impact and side loading, causing wear which eventually leads to wobble of the foreboom. The close tolerance required in reboring such bores has previously necessitated transporting the foreboom to repair shops with large machine tools and jigging capacity for such massive structures. The present invention provides a fixture embodiment (30) adapted to rebore a workpiece (10), such as a foreboom, to within close tolerances in conjunction with an easily portable powered drill or the like. Reboring operations may be performed at any convenient site. Fixture embodiment (30) comprises a guide member (32), a structure (40) for holding the guide member (32) to the workpiece (10) in a precisely positioned relationship, a boring bar (52) and a supporting and aligning structure (70). A method for reboring the workpiece (10) is also disclosed.

6 Claims, 3 Drawing Figures

REBORING FIXTURE AND METHOD

DESCRIPTION

1. Technical Field

This invention relates to a fixture useful in reworking a worn bore in a workpiece, and particularly relates to a fixture and method useful for reboring a worn bore in a massive workpiece, such as a foreboom of a excavator or the like.

2. Background Art

Excavators with two-piece booms provide excellent versatility for varying reach, depth and lift capacity needs in earthmoving operations. These two-piece booms include a stub boom supported on the excavator which is connected to a massive foreboom. A stick, operably supporting a conventional or clamshell bucket, is pivotally connected to the foreboom. The stub boom-foreboom connection includes a plurality of generally cylindrical pin bores through the foreboom. These bores are subjected to impact and side loading during operation of the excavator, which cause the bores to enlarge due to wear and to become non-cylindrical. Eventually, such wear tends to lead to wobble of the foreboom. This has required that the boom be dismantled, so the foreboom could be shipped to a repair location, such as a large machine shop, for rebuilding and precision reboring of the worn bores.

However, because the foreboom is a massive structure a considerable amount of time and expense has previously been incurred in order to transport the foreboom from the work site to repair locations having the jigging capacities, and large machine tools previously believed necessary, for precisely reboring the foreboom—and frequently the stub boom as well. It is important not only that the machining of the particular worn bore or bores of such booms be within close tolerances, but also that the spatial relationship between the plurality of bores should be precisely maintained.

DISCLOSURE OF THE INVENTION

The present invention is directed to overcoming one or more of the problems as set forth above.

In one aspect of this invention, a fixture adapted to rebore a workpiece bore in a workpiece comprises a guide member having a guide member bore defining an axis, means for holding the guide member to the workpiece with the axis of the guide member bore and the workpiece bore in a precisely positioned relationship, an elongated boring bar having a portion adapted to hold a cutting tip in selectively adjustable positions, and means for supporting and aligning the boring bar with the axis of the guide member bore.

In another aspect of this invention, a method for repairing a massive workpiece, such as a foreboom of an excavator, is disclosed.

Both the fixture and the method provide that reboring operations may be performed on a workpiece to within close tolerances, yet such operations may be readily performed at substantially any site. The time and expense attributable to transporting a workpiece to specialized repair locations is thus obviated.

The fixture may be readily assembled with the workpiece to precisely rebore the workpiece bore thereof. For example, the fixture is particularly useful with an excavator foreboom, and may be readily assembled with the foreboom and utilized in the field adjacent a construction site or the like in conjunction with easily portable power means.

BEST MODE OF CARRYING OUT THE INVENTION

Figure 1:
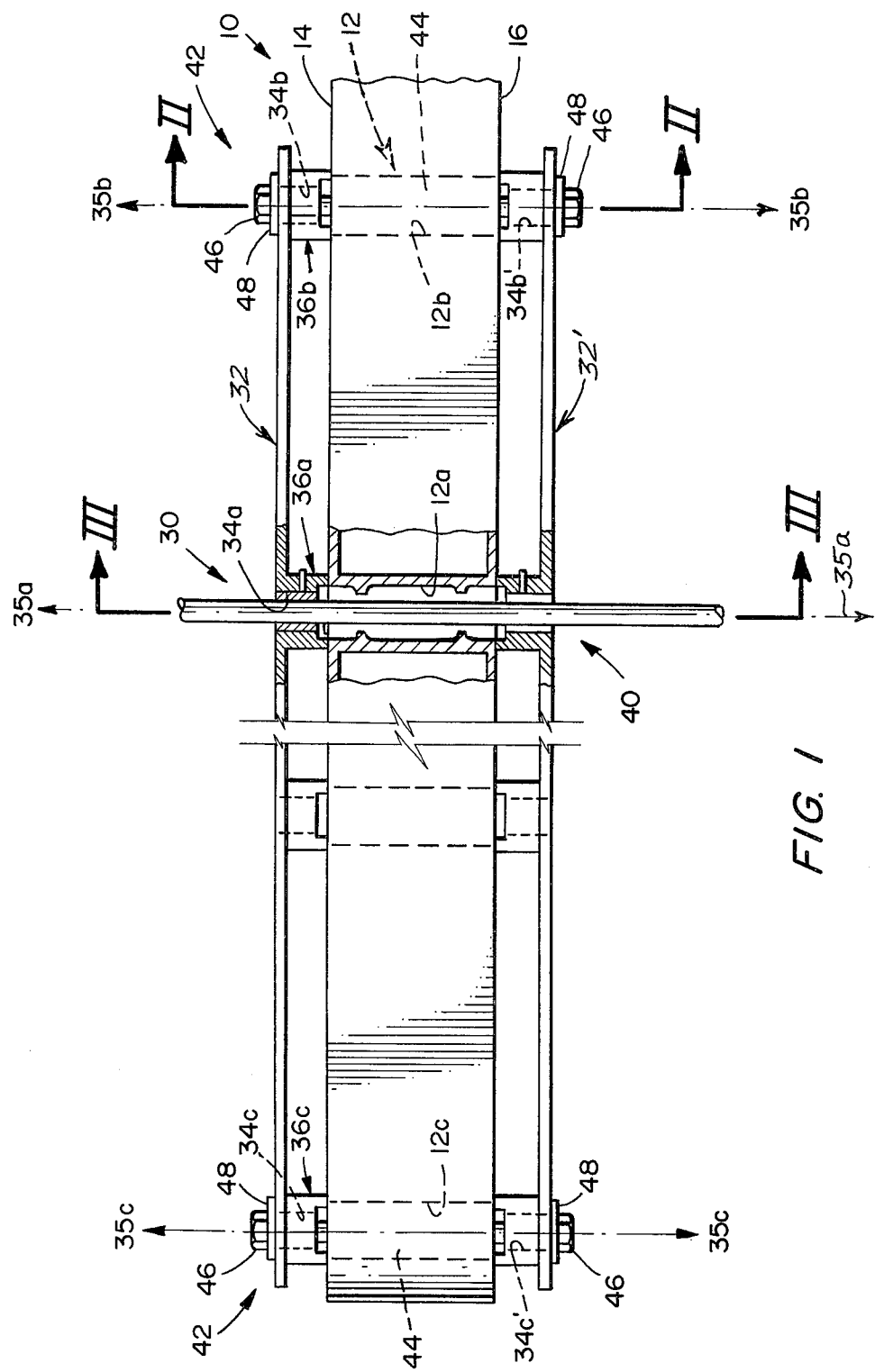
FIG. 1 is a partially sectioned, top plan view of a workpiece assembled with a fixture that forms an embodiment of the present invention.

Referring to FIG. 1, a longitudinally extending workpiece 10, such as a massive foreboom, has a plurality of spaced apart workpiece bores 12 extending between one side 14 and an other side 16 of workpice 10. Workpiece bores 12 are generally transversely oriented with respect to the longitudinal extension of workpiece 10, and each workpiece bore 12 opens onto a respective one and other sides 14,16. Workpiece bores 12 shall hereinafter sometimes be individually described as a first, or worn, workpiece bore 12a, a second workpiece bore 12b and a third workpiece bore 12c.

It is within the scope of the present invention that only one or more than three workpiece bores may be present in workpiece 10. When workpiece 10 is a foreboom, for example, a fourth bore usually is present. Workpiece bores 12 are normally substantially equivalent, with the exception described hereinafter.

Figure 2:
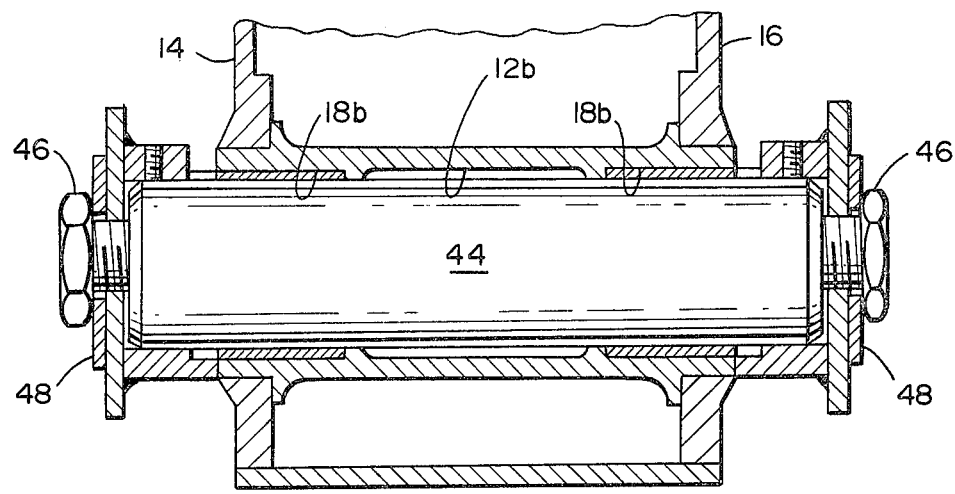
FIG. 2 is a cross-sectional view taken along lines II—II of FIG. 1.
Figure 3:
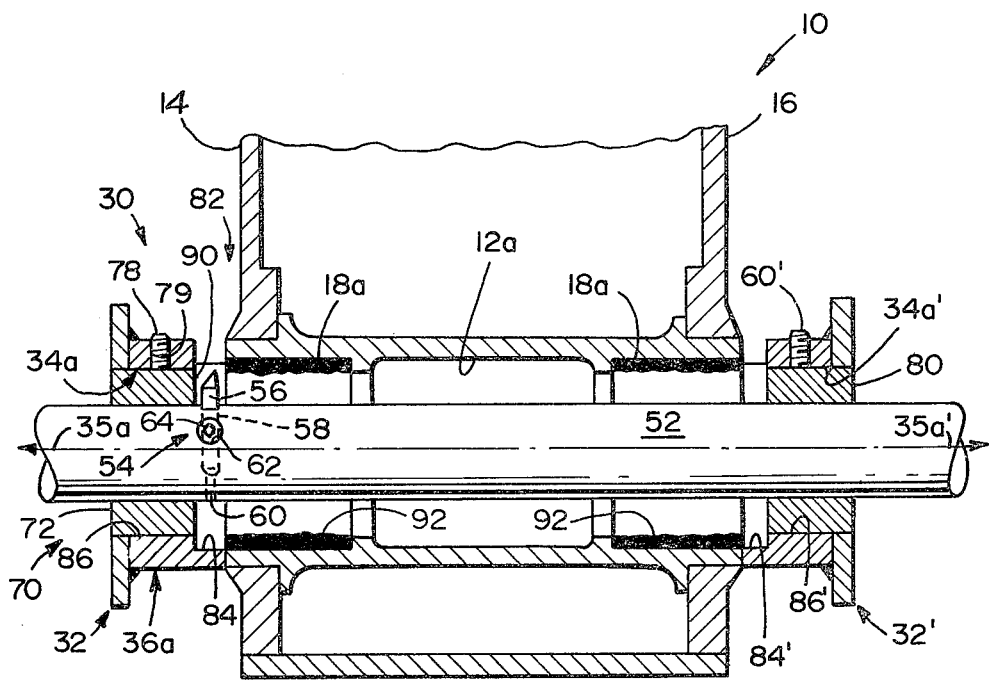
FIG. 3 is a cross-sectional view taken along lines III—III of FIG. 1.

Referring to FIG. 3, first, or worn, bore 12a is relatively worn and has generally cylindrical surface portions 18a adjacent one and other sides 14,16 respectively. Referring to FIG. 2, second bore 12b has cylindrical surface portions 18b. Third bore 12c has cylindrical surface portions 18c (not illustrated, but analogous, to the portions 18b). Comparing FIGS. 2 and 3, the first, or worn, bore 12a differs from second and third bores 12b,12c in that at least one, usually both, of the surface portions 18a thereof is enlarged due to wear and usually such enlargement will be non-concentric.

Returning to FIG. 1, a fixture 30 in accordance with the present invention is adapted to rebore at least one, usually both, of the surface portions 18a of first bore 12a. Fixture 30 is particularly adapted to rebore first bore 12a when the workpiece 10 also has two substantially non-worn bores, such as second and third bores 12b,12c.

Fixture 30 comprises a guide member 32 having a first guide member bore 34a extending along an axis 35a. Guide member 32 is of a construction sufficient for positioning guide member bore 34a into a generally coaxial relationship with first workpiece bore 12a, usually such that guide member 32 will be generally parallel to and along one side 14. More particularly, guide member 32 is of a construction sufficient for precisely positioning axis 35a of first guide member bore 34a into a predetermined relationship with two spaced apart reference points on workpiece 10. In the predetermined relationship the two spaced apart reference points will normally be located at and by second and third workpiece bores 12b,12c respectively.

The sufficient construction of guide member 32 may be where guide member 32 is formed as a rigid, preferably longitudinally extending member which extends a distance somewhat greater than the distance spanning between the first, second and third bores 12a,12b,12c.

First guide member bore 34a is cylindrical and transversely oriented with respect to the longitudinal extension of guide member 32. A first tubular boss 36a outwardly protrudes from guide member 32 and has first guide member bore 34a therethrough.

Second and third tubular bosses 36b,36c also outwardly protrude from guide member 32 and have second and third guide member bores 34b,34c therethrough. Second and third guide member bores 34b,34c are equivalent to first guide member bore 34a, and define axes 35b,35c respectively. The distance between and spatial relationship of first, second and third guide member bores 34a,34b,34c is precisely predetermined and corresponds to the desired distance between and spatial relationship of first, second and third workpiece bores 12a,12b,12c.

Fixture 30 includes a means such as clamping assembly 40 for holding guide member 32 to workpiece 10 with axis 35a in the precisely positioned relationship. Clamping assembly 40 may include an other guide member 32' and means such as fastener assembly 42 for releasably connecting guide members 32,32' together.

The other guide member 32' is an analogous structure to guide member 32, and like parts shall be hereinafter be identified by like reference numerals, but with the addition of a prime symbol. Guide member 32' may be positioned generally parallel to and along other side 16 of workpiece 10 so as to form a mirror image of guide member 32.

Fastener assembly 42 is for releasably connecting guide members 32,32' together and to workpiece 10. For example, referring to FIGS. 1 and 2, a pin 44, bolt 46 and washer 48 may be assembled to releasably connect guide member 32 to workpiece 10 along side 14 at second bore 12b. A similar assemblage of another pin 44, bolt 46 and washer 48 is located along side 14 at third bore 12c. Pins 44 are snugly fitted in and extend through second and third workpiece bores 12b,12c, and are connected along side 16 to other guide member 32' by corresponding bolts 46 and washers 48. This ensures that first tubular boss 36a, and hence axis 35a of first guide member bore 34a, is rigidly held and correctly positioned with respect to relatively nonworn second and third workpiece bores 12b,12c. First tubular boss 36a' will be likewise held and axes 35,35' will be coincident. Thus, when first workpiece bore 12a lies between second and third workpiece bores 12b,12c, the the two reference points will normally be in a straddling relationship with axis 35a, whereas when first workpiece bore 12a does not lie between second and third workpiece bores 12b,12c, then axis 35a will be in a cantilevered relationship from the two reference points.

Referring to FIG. 3, fixture 30 may further include an elongated boring bar 52 having a portion 54 adapted to hold a cutting tool 56 in various, selectively adjustable positions. Cutting tool 56 projects radially outwardly with respect to boring bar 52.

Portion 54 is preferably adapted to hold cutting tool 56 by means such as a stepped bore 58 extending diametrically across and through boring bar 52. Cutting tip 56 is partially received into stepped bore 58, and is engaged therein with the tip of a set screw 60. A pair of opposed holes 62 (only one shown) may be tapped into boring bar 52 in a sideways relationship to stepped bore 58 with a pair of set screws 64 being disposed in respective holes 62 for securing cutting tool 56. As may be understood, upon turning the set screw 60 further into stepped bore 58, cutting tip 56 is responsively extended into a radially outwardly position. Cutting tip 56 may be chosen from various commercially available such items, and is of a harder material than the material forming surface portions 18a.

Referring to FIG. 3, fixture embodiment 30 further comprises a means 70 for supporting portion 54 of boring bar 52 within first workpiece bore 12a and for aligning the longitudinal axis of boring bar 52 with axis 35a of guide member bore 34a. Means 70 preferably includes a one pilot bushing 72 and an other pilot bushing 80.

Pilot bushing 72 is positionable into guide member bore 34a and held therewithin adjacent one side 14 of workpiece 10 by means such as a set screw 78 receiveable into hole 79 of boss 36a and engagable with pilot bushing 72. Other pilot bushing 80 is mountable on workpiece 10 adjacent other side 16 thereof. For example, the other pilot bushing 80 can be adapted to be fit into first workpiece bore 12a, at the surface portion 18a adjacent other side 16 when such surface portion 18a is substantially non-worn. More preferably, however, other pilot bushing 80 will be mounted on workpiece 10 by being adapted to be fit into first guide member bore 34a' of other guide member 32'. Pilot bushings 72,80 have inner diametric dimensions adapted to closely receive, support and align boring bar 52 therein, but which permit boring bar 52 to be freely rotated while supported and aligned thereby.

It is preferred that first boss 36a include a means 82 for providing access to portion 54 when boring bar 52 is supported on and extended between pilot bushings 72,80. As may be understood, in this position boring bar 52 is precisely aligned with the coincident axes 35a,35a' of first guide member bores 34a,34a'. Access is desirable in order to selectively adjust cutting tool 56 into at least the first cut position prior to commencement of reboring.

Means 82 may include a counterbore 84 having a larger diametric dimension than does first guide member bore 34a. One pilot bushing 72 is located, or fit, in first guide member 34a and is substantially co-terminus therewith. A cut-out 90 opens onto exterior surface of first boss 36a and communicates with counterbore 84. Thus, boring bar 52 may be positioned for access to cutting tool 56 and to set screw 60 through cut-out 90.

Industrial Applicability

As previously noted, fixture 30 is particularly useful for a workpiece 10 such as the massive, longitudinally extending foreboom of an excavator when a bore thereof, such as previously described first workpiece bore 12a, is worn relative to second and third workpiece bores 12b,12c.

The foreboom, or workpiece 10, is removed from its connection with a stub boom. If desired, workpiece 10 may be raised to a convenient height above ground level for reboring operations by means, such as stands or blocks, thereunder. The particular location for performing reboring operations on workpiece 10 may be any convenient site. Bearings, which are normally mounted in the workpiece bores 12, are then removed from the worn bore 12, for example first workpiece bore 12a, but retained in second and third workpiece bores 12b,12c (see FIG. 2). Workpiece 10 is then ready to be rebored. Such reboring is a method for repairing workpiece 10 in accordance with the present invention.

Referring to FIG. 3, a quantity of a metal 92 is fused by welding or the like in first workpiece bore 12a circumferentially along surface portions 18a thereof adjacent sides 14,16 of workpiece 10.

Referring to FIGS. 1 and 2, pins 44 are inserted into second and third workpiece bores 12b,12c. A pair of guide members, such as guide members 32,32', are positioned along sides 14,16 of workpiece 10 so that the first, second and third guide member bores 34a,34b,34c and 34a',34b',34c' are placed into a corresponding relationship with first, second and third workpiece bores 12a,12b,12c respectively. More particularly, second and third guide member bosses 36b,36c and 36b',36c' are fit over ends of pins 44.

Pins 44, together with bolts 46 and washers 48, function to releasably connect guide members 32,32' together and with workpiece 10. So connected, the first guide member bores 34a,34a' are held in the precise relationship with second and third workpiece bores 12b,12c as previously described.

Generally referring to FIG. 3, the other pilot bushing 80 is inserted into first guide member bore 34a' at side 16 of workpiece 10. The set screw 60' is then turned to hold pilot bushing 80 therein. Boring bar 52 is fed from side 14, through workpiece bore 12a, and into a supporting relationship with pilot bushing 80. Cutting tool 56 will normally be just short of being extended into first workpiece bore 12a. The one pilot bushing 72 is then inserted into first guide member bore 34a. Boring bar 52 will thus be supported between the pilot bushings 72,80 with cutting tool 56 therebetween and can be freely turned therein. Cutting tool 56 may then be selectively adjusted for the desired amount of cut to be made. A typical, initial cut is on the order of 0.020 inches (0.5 mm). A typical, final cut is in the order of not more than 0.004 inches ±0.001 inches (0.10 mm±0.03 mm).

The end of boring bar 52 adjacent side 14 of workpiece 10 will be connected to various conventional means (not illustrated) for rotatingly powering cutting tool 56 within first workpiece bore 12a while the boring bar 52 is axially advanced a desired distance along surface portion 18a adjacent side 14 of workpiece 10. For example, a feed assembly can be mounted at the end of boring bar 52 and a universal joint can interconnect the feed assembly with a drill motor. A drill motor having a 0.5 inch (12.7 mm) capacity or larger is a typical power means.

In normal use, after surface portion 18a adjacent side 14 has been rebored, the boring bar 52 and pilot bushings 72,80 will be removed, and the same procedure can be repeated, but from side 16. A typical foreboom bore may be rebored into a diameter within tolerances of about ±0.002 inches (0.05 mm).

Accordingly, the inventive fixture provides a portable and readily assembled structure for repairing a workpiece without sacrifice of precision in the reboring, and may be utilized for quickly repairing a massive workpiece at any convenient site.

Although fixture embodiment 30 is particularly useful for repairing the foreboom of an excavator, it should be made obvious to those skilled in the arts relating hereto that a fixture in accordance with the present invention will find applications with workpieces other than a foreboom. For example, boring bar 52 and bushings 72,80 are readily adaptable to rebore a worn bore in a stub boom of an excavator in conjunction with a repaired foreboom. In such an instance, for example, the foreboom may be utilized as a guide member in accordance with the present invention.

Other aspects, objects, and advantages of this invention can be obtained from a study of the drawings, the disclosure, and the appended claims.

We claim:

1. A fixture (30) adapted to rebore a first workpiece bore (12a) in a workpiece (10), said workpiece (10) having said first workpiece bore (12a) and also having second and third workpiece bores (12b,12c), said workpiece bores (12a,12b,12c) being spaced apart and extending between a one side (14) and an other side (16) of said workpiece (10), said fixture (30) comprising:

a one and an other rigid guide members (32,32') each having first, second and third guide member bores (34a,34b,34c and 34a',34b',34c') transversely extending therethrough and being spaced apart to correspond with said first, second and third workpiece bores (12a,12b,12c), said one and other guide members (32,32') of a construction sufficient for precisely positioning said first guide member bores (34a,34a') thereof into a predetermined relationship with said second and third workpiece bores (12b,12c), with said guide members (32,32') being along said one and other sides (14,16) respectively of said workpiece (10) and with said first, second and third guide member bores (34a,34b,34c and 34a',34b',34c') placed into a corresponding relationship with said first, second and third workpiece bores (12a,12b,12c) respectively;

means (42) for releasably connecting said guide members (32,32') together through said second and third workpiece bores (12b,12c) to hold said first guide member bores (34a,34a') in a predetermined relationship with said second and third workpiece bores (12b,12c) and in a generally coaxial relationship with said first workpiece bore (12a); and, a one and an other pilot bushings (72,80), said one pilot bushing (72) adapted to be fitted within said first guide member bore (34a) of said one guide member (32), said other pilot bushing (80) adapted to be fitted within said first guide member bore (34a') of said other guide member (32').

2. The fixture (30) as in claim 1 including:

an elongated boring bar (52) supportable on said pilot bushings (72,80) and extendable through said first workpiece bore (12a), said boring bar (52) having a cutting tool (56) at a portion (54) thereof, said portion (54) adapted to hold said cutting tip (56) in selectively adjustable, outwardly protruding positions.

3. The fixture (30) as in claim 2 wherein:

said one guide member (32) includes means (82) for providing access to said portion (54) of said boring bar (52) when said boring bar (52) is supported on said pilot bushings (72,80) and extended through said first foreboom bore (12a).

4. A method for reboring a massive, longitudinally extending workpiece (10) with a one and an other sides (14,16), said workpiece (10) having spaced apart first, second and third workpiece bores (12a,12b,12c) transversely extending with respect to said workpiece (10) between said one and other sides (14,16), said first bore (12a) being relatively more worn with respect to the others (12b,12c), comprising the steps of:

fusing a quantity of a metal (92) is said first workpiece bore (12a) circumferentially along a surface (18a) thereof;

positioning a one and another rigid guide members (32,32') along said one and other sides (14,16) respectively of said workpiece (10), said one and other guide members (32,32') each having a first, second and third guide member bores (34a,34b,34c and 34a',34b',34c'), the positioning including placing said first, second and third guide member bores (34a,34b,34c and 34a',34b',34c') into a corresponding relationship with said first, second and third workpiece bores (12a,12b,12c) respectively;

releasably connecting said one and other guide members (32,32') together and with said workpiece (10) to hold said first guide member bores (34a,34a') in a predetermined relationship with said second and third workpiece bores (12b,12c); and, inserting at least one pilot bushing (72 or 80) into each of said first guide member bores (34a and 34a') of said respective one and other guide members (32,32'), and feeding an elongated boring bar (52) into said first workpiece bore (12a) and into a supported relationship with said pilot bushings (72,80), said boring bar (52) adapted to adjustably hold a cutting tool (56) in an outwardly protruding position.

5. The method as in claim 4 including:

selectively adjusting the outwardly protruding position of said cutting tip (56).

6. The method as in claim 5 including rotatingly powering said cutting tool (56) within said first workpiece bore (12a) while axially advancing said boring bar (52) a desired distance between said one and other sides (14,16) of said workpiece (10).

* * * * *